Figure 1:
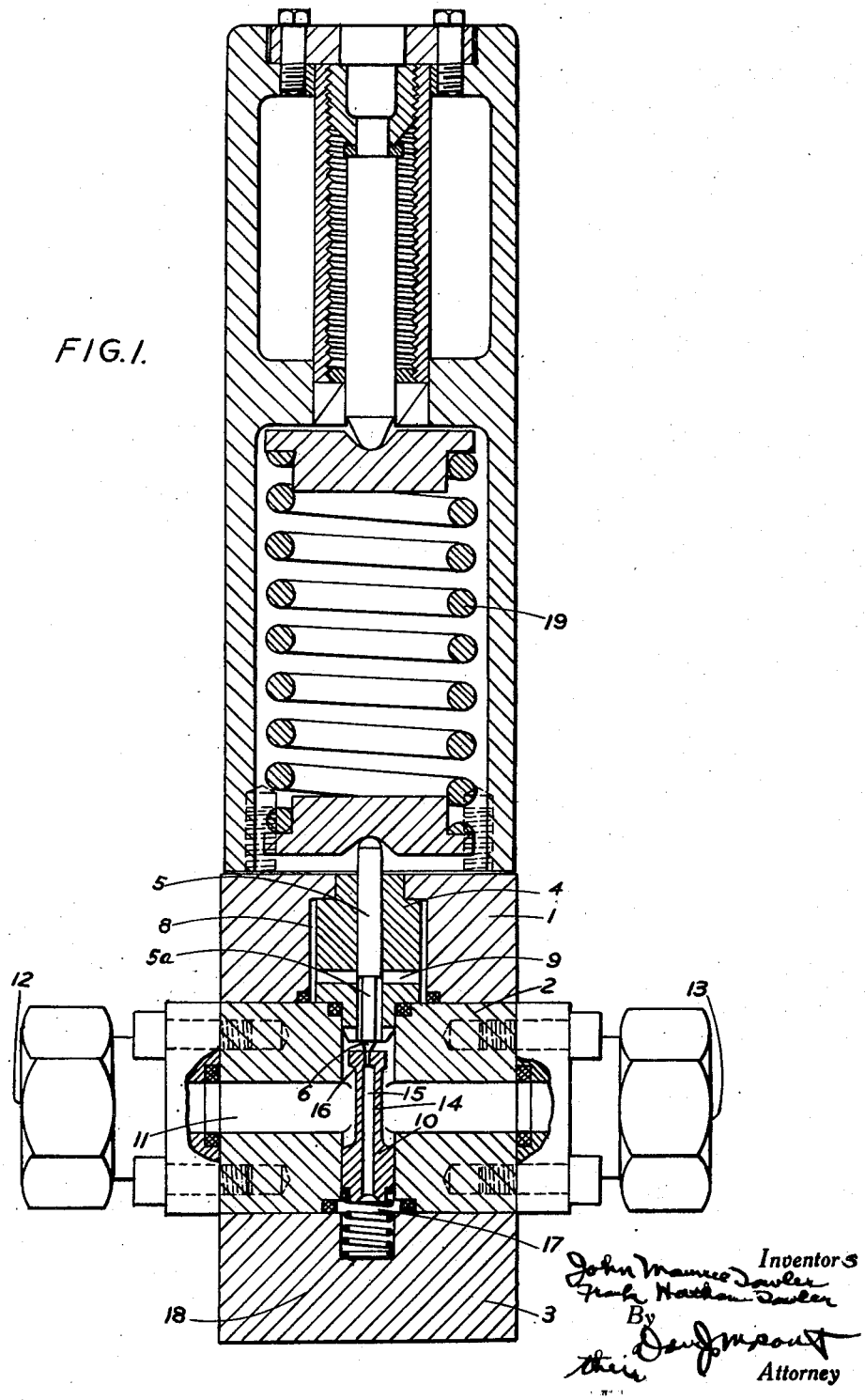

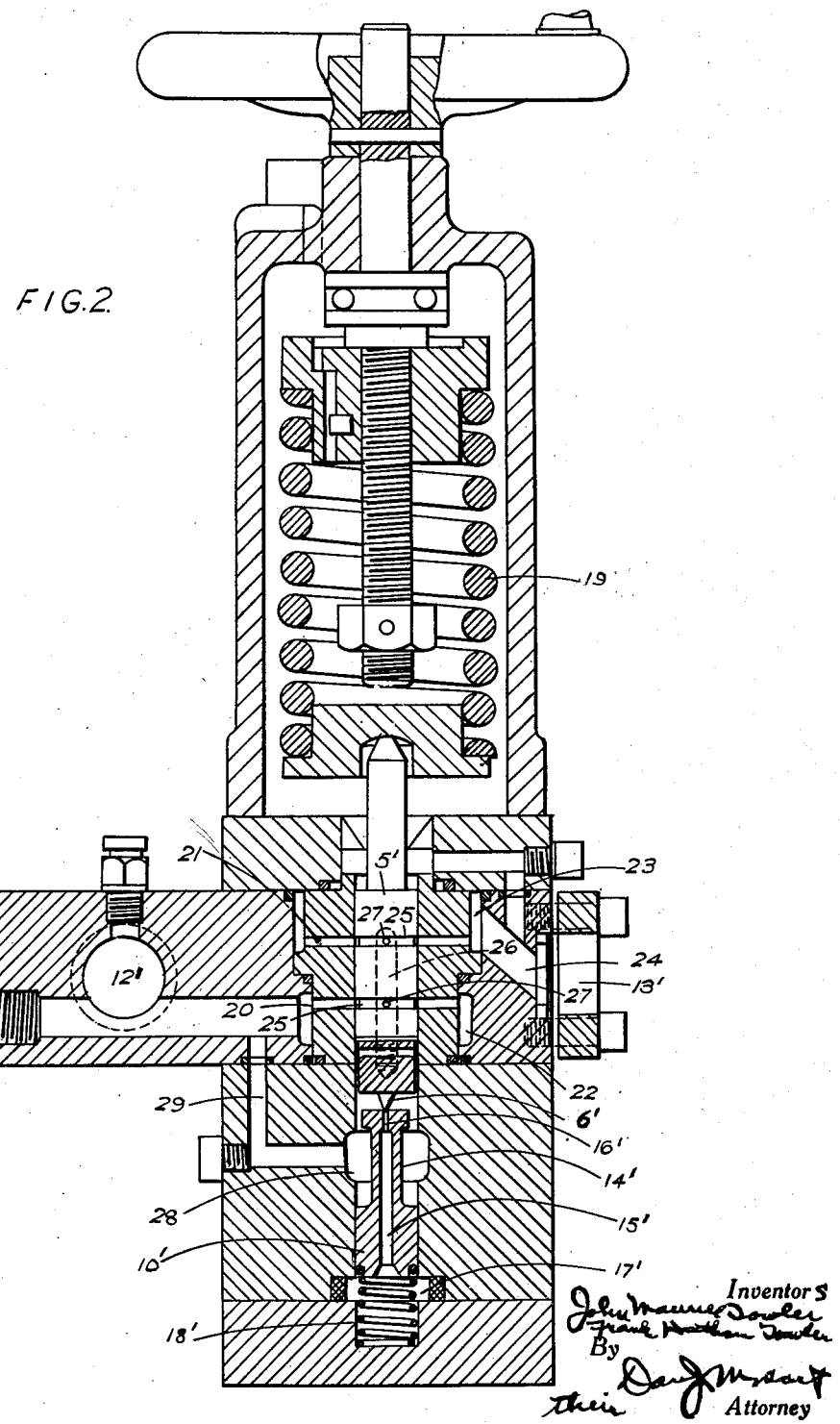

Patented Feb. 2, 1954

2,667,894

UNITED STATES PATENT OFFICE 2,667,894

PRESSURE RELIEF VALVE WITH DAMPING PISTON

John Maurice Towler, Harrogate, and Frank Hathorn Towler, Otley, England, assignors to Electraulic Presses Limited, Rodley, England, a corporation of England Original application February 17, 1944, Serial No. 522,842. Divided and this application February 20, 1948, Serial No. 9,854

Claims priority, application Great Britain March 9, 1943

5 Claims. (Cl. 137—514)

This invention relates to hydraulic reducing or relief valves of the type in which the liquid, acting upon the flow of which is to be controlled, one end of a valve plunger moves said plunger against an opposing spring, weight, or other load and in which the return movement of the plunger is damped by means comprising a damping piston.

The object of the present invention is to simplify the construction of the reducing or relief valve according to our co-pending application Serial No. 522,842, filed February 17, 1944 (now abandoned), and of which this application is a division, and the improvement or modification consists in forming the passage which conveys the pressure liquid from the inlet or outlet to the outer side of the piston within the piston itself and not in the valve body as before and in providing a valve of the needle type on the underside of the valve plunger for closing said passage to prevent the free escape of the liquid and so damp the return movement of the valve plunger.

In order that the invention may be clearly understood and carried into effect two embodiments of the same will now be described by way of example, by aid of the accompanying drawings in which:

Fig. 1 is a vertical section through a relief valve, shown in the partly open position, having a single cut-off and constituting one of the aforesaid embodiments according to this invention, and Fig. 2 is a similar view showing the application of the improvements according to the present invention to a reducing or relief valve having a double cut-off. This valve is shown in the fully open position.

Referring now to Fig. 1 of the drawings, the valve therein illustrated comprises a body composed of three superimposed sections, an upper section 1, an intermediate section 2 and a lower section 3. The upper body section 1 is bored to receive a bush 4 and this bush in turn is bored and lapped to receive, as a close sliding fit, a packingless plunger 5, constituting the valve member proper. This plunger 5 is reduced at 5a for a predetermined distance from its lower end and at the extremity of said reduced portion it is turned to a point to form a needle valve 6 for a purpose hereinafter described.

The bush 4 is smaller in diameter than the recess in the upper section 1 in which it is located, to provide an annular space 8. This space 8 is in open communication with exhaust and it also communicates with the bore containing the plunger 5 by means of two or more transverse passages 9. When the plunger is in its lower or closed position it closes the inner ends of these passages 9.

The intermediate section 2 of the valve body is bored axially to accommodate a piston 10 and transversely to provide a straight-through passage 11 for pressure liquid passing from the inlet 12 to the outlet 13. This transverse passage is bisected by the vertical bore containing the piston 10, and said piston is formed with a reduced portion 14 to provide a clearance around which the liquid may flow in its passage from the inlet 12 to the outlet 13. The piston 10 has a central hole 15 extending through its interior from the bottom of the piston to within a short distance of the opposite end. The passage thus formed is continued through the upper portion of the piston by means of a substantially smaller hole 16. There is thus provided a passage from one end of the piston to the other through which pressure liquid from the passage 11 may be permitted to pass into a space 17 beneath the lower end of the piston. Normally this passage through the piston is closed at the outer end of the hole 16 by the needle valve 6. The piston 10 is held against this needle valve when the valve member or plunger 5 is in the closed position by a small spring 18 in the space 17, and the plunger 5 is loaded against lift by a spring 19. The load thus applied by the spring 19 may be adjusted by a screw adjustment. Consequently, the valve may be set to blow off at a given pressure.

In operation, and assuming a sudden rise in pressure within the passage 11, the plunger 5 will be forced upwards against the spring 19 and away from the piston 10 thus causing the hole 16 in the piston 10 to be opened and allowing the pressure balance to be restored on the underside of the piston. Immediately the pressure balance is restored the small spring 18 will move the piston 10 upwards until the needle valve again closes the hole 16. Liquid within the space 17 is thus trapped and can only escape slowly past the piston. In consequence the downward movement both of the plunger 5 and the piston 10 imparted by the spring 19 will be at a relatively slow speed. In other words such movement will be damped. The fall in pressure of the liquid acting upon the underside of the plunger 5 will occur in consequence of the resulting upward movement of the plunger as such movement will bring its reduced portion 5a into correspondence with the passages 9, as shown in Fig. 1, thus connecting the space beneath the plunger with the annular space 8, and allowing pressure liquid from the passage 11 to escape through the exhaust.

In Fig. 2 the improvements according to the present invention are shown applied to a reducing valve having a double cut-off instead of the single cut-off shown in Fig. 1. Corresponding parts are identified by the same reference numerals as in Fig. 1, but being primed. In this modification the inlet 12' and the outlet 13' are not connected by a straight-through passage as in Fig. 1 but are connected by two sets of longitudinally spaced passages which are opened and closed by movement of the valve plunger.

The above mentioned passages comprise two sets of radial passages 20 and 21, one set 20 connecting the bore containing the plunger 5' with a lower annular chamber 22 receiving pressure liquid from the inlet 12', and the other set 21 connecting said bore with an upper annular chamber 23 which in turn is connected to the outlet 13' by a passage 24.

Cut in the exterior surface of the valve plunger 5' so as to encircle the same are grooves 25. These grooves are spaced longitudinally a distance equivalent to the distance between the centres of the sets of radial passages 20 and 21, with which they register when the valve plunger is in the raised position shown in the drawing. The grooves 25 communicate with a longitudinal passage 26 within the interior of the valve plunger by means of radial holes 27. By this means a passage for liquid is provided between the annular chambers 22 and 23 when the valve plunger is in the raised position, and said chambers are isolated from each other when the valve plunger is in the lowered position. In this embodiment pressure liquid from the inlet 12' has free access to an annular space 28 surrounding the damping piston 10' by means of a passage 29 in the valve body. The function of the piston 10' in this embodiment is the same as in the first embodiment.

The damping means of the present invention may be applied to the master control valve illustrated in Fig. 2 of our co-pending application Serial No. 522,844, filed February 17, 1944, now Patent No. 2,561,431 issued July 24 1951. For the purpose of the adaptation the lower end of the valve plunger in the said master control valve is provided with the needle valve 6' as in Fig. 2 of the present application whilst for the damping piston 21 of the co-pending application there is then substituted the piston 10' and the intermediate and lower sections of the valve body illustrated in present Fig. 2.

We claim:

1. A hydraulic valve comprising a body having a valve bore and a pressure liquid inlet and an outlet spaced from said inlet axially of said bore, passages connecting said inlet and said outlet with said bore, a plunger slidable in the bore for closing and opening a communication between said passages, means for maintaining said plunger in a normal communiction closing position with a predetermined force, a damping piston slidable in the valve body having means normally maintaining said piston in disengageable end contact with the plunger, the inner end of said piston being exposed to the pressure in said bore, a chamber in the valve body at the outer end of said piston, a passage for admitting pressure liquid from said inlet to said chamber, valve means connected to said plunger for opening said passage during the movement of said plunger to its communication opening position aforementioned due to a predetermined rise in the pressure of the liquid, and for closing said passage during the return movement of the plunger to its normal position to prevent free escape of the liquid from said chamber, and means independent of said valve means for releasing the liquid from said chamber at a comparatively slow rate, whereby to damp the return movement of the plunger.

2. A hydraulic valve comprising a body having a pressure liquid inlet and an outlet spaced from said inlet, a bore, passages connecting said inlet and said outlet with said bore, a plunger slidable in the bore for closing and opening communication between said passages, means for maintaining said plunger in a normal communication closing position with a predetermined force, a cylinder in the valve body, a damping piston separable from said plunger and slidable in said cylinder and having means normally maintaining said piston in end contact with the plunger, said piston having a diameter substantially greater than the diameter of the plunger and being exposed at the inner end to the pressure in said bore, a passage having a flow restriction therein and for admitting pressure liquid from said inlet to the outer end of said cylinder, valve means operable with said plunger for normally closing said last mentioned passage and for opening said passage during the movement of said plunger while separated from said piston to its communication opening position aforementioned due to a predetermined rise in the pressure of the liquid, and for closing said passage during the return movement of the plunger while in contact with said piston to its normal position to prevent free escape of the liquid from said cylinder, clearance space between said cylinder and said piston slowly permitting release of the liquid from said cylinder by leakage past said piston.

3. A reducing valve comprising a body having a pressure liquid inlet and an outlet longitudinally spaced from said inlet, communications between said inlet and said outlet, a plunger slidable in said body adapted to open and close said communications, spring means for maintaining said plunger in a normal position to close said communications with a predetermined force, a damping piston slidable in the valve body coaxial with the plunger and having means normally maintaining said piston in end contact with said plunger, a chamber in the valve body at the outer end of said piston, a passage extending longitudinally through the piston for admitting pressure liquid to said chamber, a valve at the end of the plunger opposed to the piston functioning to open said passage during the movement of the plunger to open the aforementioned communications between the inlet and the outlet upon a predetermined rise in the pressure of the liquid and to close said passage during the return movement of the plunger to its normal position to prevent free escape of the liquid from said chamber, and means providing slow escape of liquid from said chamber whereby to damp said return movement of the plunger.

4. A relief valve comprising a valve body having an inlet for pressure liquid and an outlet, a passage for the free flow of the pressure liquid from said inlet to said outlet, an exhaust outlet, a plunger slidable in said body having a reduced portion extending from one end thereof and exposed at said reduced end to the pressure of the liquid in said passage, means maintaining said plunger in a normal position to isolate said passage from said exhaust outlet with a predetermined force and movable upon predetermined increase in the pressure of the liquid to a position wherein said reduced portion thereof establishes communication between the aforementioned passage and the exhaust outlet, whereby the pressure in the passage is caused to fall to normal and the plunger is returned to its normal position aforesaid, a piston slidable in the valve body coaxial with the plunger and having means normally maintaining said piston in end contact with said plunger, a chamber at the outer end of said piston, a passage extending longitudinally through the piston, a needle valve at the end of the plunger opposed to the piston, functioning to open said piston passage to admit pressure liquid to said chamber during the movement of the plunger to establish communication between the aforementioned passage and the exhaust outlet, said needle valve closing said piston passage during the return movement of the plunger to its normal position to prevent free escape of the liquid from said chamber, and means providing slow escape of liquid from said chamber whereby to damp said return movement of the plunger.

5. A hydraulic valve comprising, in combination, a body having a pressure liquid inlet, a flow passage in communication with said inlet, an outlet, a passage in communication with said outlet, a valve bore, ports respectively connecting said passages to said bore, and a cylinder chamber in axial alignment with said bore, the adjacent ends of said bore and chamber being in intercommunication and in communication with said flow passage, a valve plunger reciprocable in said bore and being movable to open or close communication between said ports, spring means normally urging said plunger into closed position, a damping piston reciprocable with peripheral leakage clearance in said chamber, a valve passage opening axially through said piston and having a valve port at the inner end, a pointed valve rigid on one end of said plunger and engageable with said valve port to close the latter, and spring means in said chamber and acting on said piston to urge said piston inwardly normally to effect engagement of said valve and valve port.

JOHN MAURICE TOWLER.
FRANK HATHORN TOWLER.

References Cited in the file of this patent

UNITED STATES PATENTS

| Number | Name | Date |
|---|---|---|
| 982,400 | Walker | Jan. 24, 1911 |
| 1,291,609 | Nichols | Jan. 14, 1919 |
| 1,850,117 | McMillan | Mar. 22, 1932 |
| 1,970,131 | Douglas | Aug. 14, 1934 |
| 2,200,824 | Herman | May 14, 1940 |
| 2,286,027 | Towler | June 9, 1942 |